United States Patent [19]

Rucker

[11] 4,283,860
[45] Aug. 18, 1981

[54] LENS FIELD OF VIEW SIMULATOR

[75] Inventor: John Rucker, Olympia, Wash.

[73] Assignee: R. Ideas, Inc., Bainbridge Island, Wash.

[21] Appl. No.: 73,746

[22] Filed: Sep. 10, 1979

[51] Int. Cl.³ .................. G01B 11/00; G03B 11/04; G03B 13/02
[52] U.S. Cl. .................................... 33/277; 33/266; 354/222
[58] Field of Search .................. 40/363, 365, 366; 354/222, 295; 352/171; 33/277, 266

[56] References Cited

U.S. PATENT DOCUMENTS

| | | | |
|---|---|---|---|
| 2,157,547 | 5/1939 | Leitz | 354/222 |
| 2,232,440 | 2/1941 | De Bisschop | 354/222 |
| 2,247,104 | 6/1941 | Takacs | 354/222 |
| 2,446,738 | 8/1948 | Briskin et al. | 33/277 |
| 2,543,240 | 2/1951 | Hutchinson | 40/365 |
| 2,881,684 | 4/1959 | Brohl et al. | 354/222 |
| 2,917,968 | 12/1959 | Nojiri | 354/222 |
| 3,011,385 | 12/1961 | Frost | 354/222 |
| 3,029,720 | 4/1962 | Leitz et al. | 354/222 |
| 3,212,422 | 10/1965 | Nerwin et al. | 354/222 |
| 3,981,564 | 9/1976 | Hoos | 354/222 |
| 4,122,470 | 10/1978 | Loranger et al. | 354/295 |
| 4,177,573 | 12/1979 | Boston | 33/277 |

Primary Examiner—John W. Shepperd
Attorney, Agent, or Firm—Christensen, O'Connor, Johnson & Kindness

[57] ABSTRACT

A lens field of view simulator is provided to allow a photographer to view a desired photographic subject, framed as the subject would be framed viewing it through the field of view provided by a camera with a predetermined focal length lens attached. The field of view simulator includes a central portion having a viewing aperture formed therein through which the user views the subject to be photographed and a plurality of plates, each plate having a lens field of view simulation aperture formed therethrough, each of the plates being hingedly attached to the central portion to allow movement of the plates into and out of register with the viewing aperture in the central portion. Preferably, the entire simulator is fabricated as a single unit and is preferably molded of a lightweight plastic, for example, polyethylene.

7 Claims, 6 Drawing Figures

U.S. Patent      Aug. 18, 1981      4,283,860
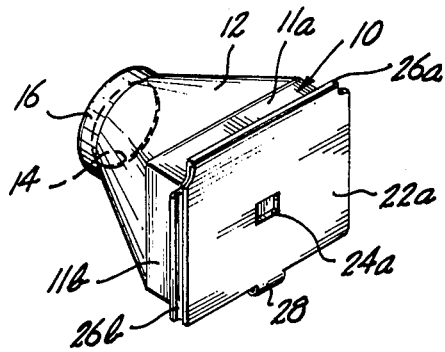
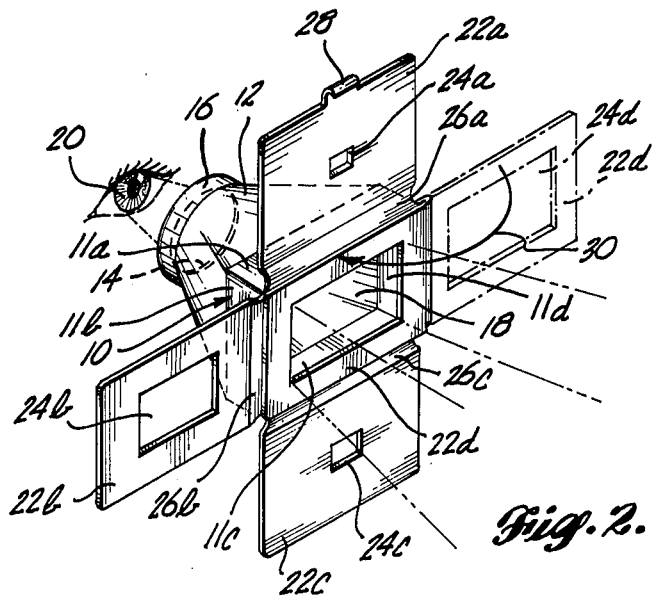
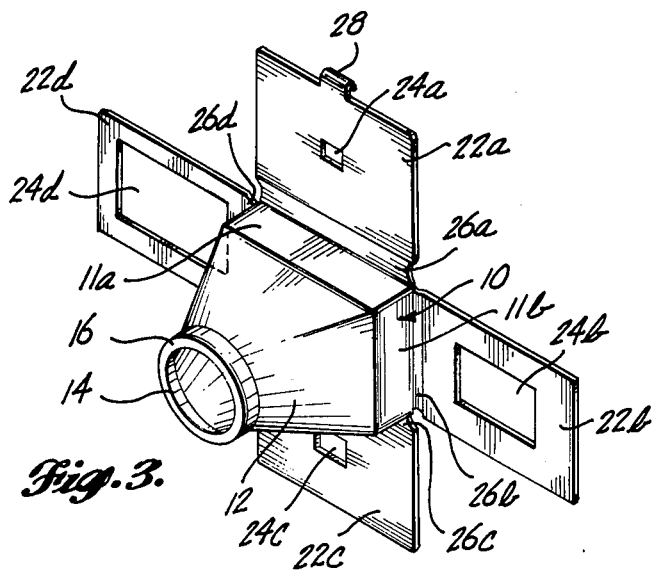
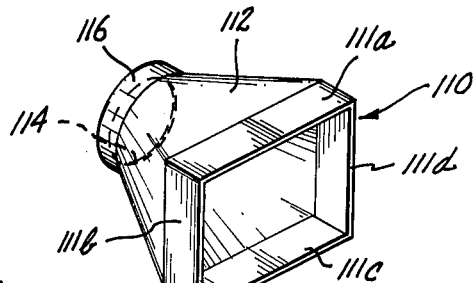
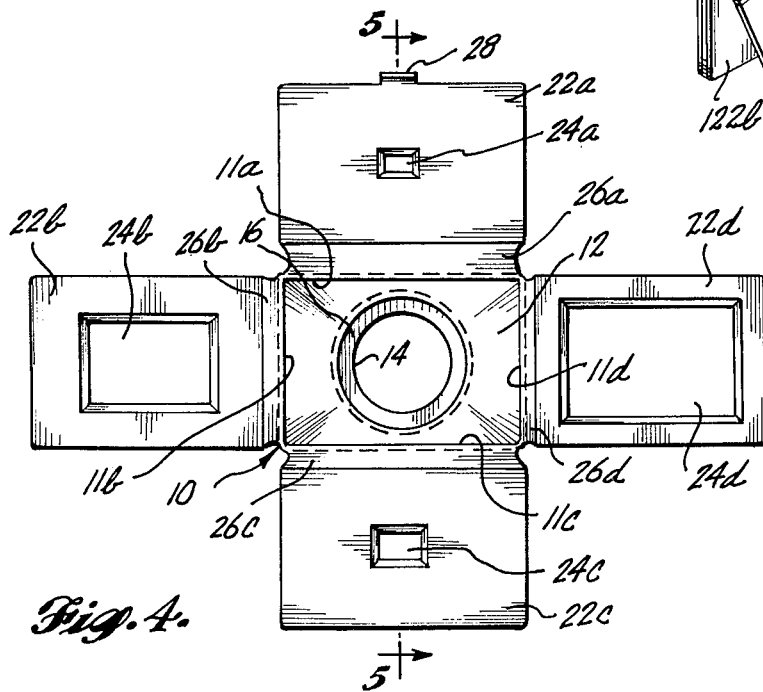
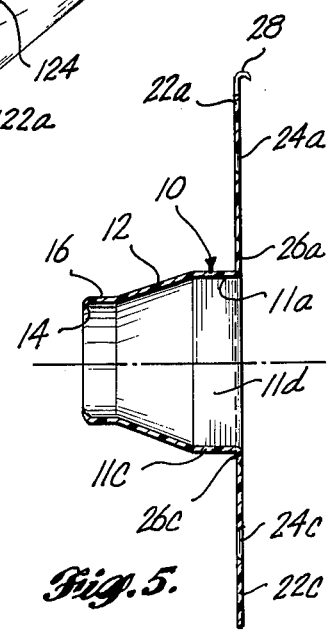

LENS FIELD OF VIEW SIMULATOR

BACKGROUND OF THE INVENTION

This invention relates to photographic accessories and more particularly relates to a lens field of view simulator that enables a photographer to frame a subject prior to viewing that subject through the actual lens to be used in taking the photograph with a camera.

It is well known in the photographic art that the framing of a picture taken with a camera, that is, the area encompassed by the picture, is determined by the field of view of the lens on the camera and will vary depending upon the particular focal length lens used with the camera. It is a time-consuming and sometimes physically difficult task to attach various lenses to a camera one after the other in order to view the subject with the different lenses to determine which lens give the particular framing desired by the photographer.

It is, therefore, an object of the present invention to provide a device that will allow a photographer to determine the framing that the field of view of a certain lens will give to a particular subject without the necessity of attaching the actual lens to the camera.

It is another object of this invention to provide such a device that allows a photographer to selectively view the subject to be photographed through one of several apertures representative of various fields of view provided by lenses of different focal lengths.

It is a further object of the present invention to provide such a device in which the various apertures are easily accessible to the user and attached to the unit and that is preferably manufactured as a one-piece unit.

It is an additional object of the invention to provide such a device that is lightweight, easily transportable, resistant to damage, and relatively inexpensive to manufacture.

SUMMARY OF THE INVENTION

In accordance with the foregoing objects a lens field of view simulator is provided including a central portion having a viewing aperture formed therein through which the user views the subject to be photographed. A plurality of plates are provided, each plate having a lens simulation aperture formed therethrough, each aperture being of a different size and corresponding to the field of view that would be provided by a lens of a certain focal length. The plates are movably mounted on the central portion for selective placement of the plates into register with the viewing aperture.

In the preferred embodiment each of the plates is hingedly coupled to the central portion for swinging movement of each of the plates into and out of register with the viewing aperture.

Preferably, the central portion and plates are formed in one integral unit from a lightweight plastic material, for example, polyethylene. In such a manufacture the hinges attaching each of the plates to the central portion are also integrally molded with the plates and central portion.

BRIEF DESCRIPTION OF THE DRAWINGS

The foregoing and other objects and advantages of the present invention will be better appreciated by those of ordinary skill in the art, and others, by reading the ensuing specification in conjunction with the attached drawings wherein:

FIG. 1 is an isometric view of a lens field of view simulator made in accordance with the principles of the present invention configured for transport.

FIG. 2 is an isometric view of the lens field of view simulator of FIG. 1 ready for use by an operator with an aperture plate in position.

FIG. 3 is an isometric view of the lens field of view simulator of FIG. 2 from a different viewing angle.

FIG. 4 is a front elevational view of the lens field of view simulator of FIG. 3.

FIG. 5 is an elevational side view in section of the lens field of view simulator of FIG. 3 viewed along lines 5—5 of FIG. 4.

FIG. 6 is an isometric view of another embodiment of a lens field of view simulator made in accordance with the principles of the present invention.

DETAILED DESCRIPTION OF THE PREFERRED EMBODIMENT

Referring now to FIGS. 1 and 2, one embodiment of a lens field of view simulator made in accordance with the principles of the present invention includes a central portion 10 comprised of four rectangular panels 11a, 11b, 11c, and 11d, respectively. The panels are joined end to end and at right angles to enclose a rectangular viewing aperture 18. A transition chamber 12 is affixed to an open end of the center portion 10. The transition chamber 12 is substantially in the shape of a truncated pyramid the base of which is attached to the center portion 10. The side walls of the transition chamber 12 converge as they extend away from the central portion 10 and terminate in an eyepiece aperture 14. An annular eyepiece ring 16 is affixed to the apex of the transition chamber 12 in register with the eyepiece aperture 14. In use, the simulator is held so that the annular eyepiece ring 16 is proximately positioned to the eye 20 of the operator so that the operator can view a subject that he wishes to photograph through the optical path provided by the eyepiece aperture 14, transition chamber 12, and viewing aperture 18.

Each of the edges of the panels 11a–d opposite the transition chamber 12 has mounted thereto a simulator plate 22a, 22b, 22c, and 22d, respectively. The simulator plates are each swingably mounted on the central portion 10 so that they can be swung into and out of register with the viewing aperture 18. Each of the simulator plates 22a, 2b, 22c, and 22d has formed therein a rectangular lens field of view simulation aperture, 24a, 24b, 24c, and 24d respectively, each plate having an aperture of different size ranging from the smallest aperture in plate 22a to the largest aperture in plate 22d. The apertures are of a size simulating the particular field of view provided by a lens of a certain focal length, on a 35 mm. camera for example, the aperture 24a in plate 22a is of a size corresponding to the field of view provided by a 200 millimeter lens. Likewise, aperture 24b corresponds to the field of view provided by a 55 millimeter lens; aperture 24c corresponds to the field of view provided by a 135 millimeter lens; and aperture 24d corresponds to the field of view provided by a 35 millimeter lens. Preferably the viewing aperture 18 corresponds to the field of view provided by a 28 mm. lens, therefore five lens fields of view are simulated with four simulator plates.

In the illustrated embodiment the hinges 26a, 26b, 26c, and 26d by which the plates 22a, 22b, 22c, and 22d, respectively, are attached to the edges of the panels of the central portion 10 are integrally formed with the central portion 10 and plates 11a–d and are preferably made of a material which permits repeated bending such as those materials known in the art as "living hinge" plastics, polyethylene being one such material. By molding the central portion 10 and plates 22a–d from a plastic in a unitary construction the lens field of view simulator of the present invention is relatively inexpensive to manufacture and also is lightweight and easy to carry. It would, however, be possible to use conventional hinges to attach separate plates to a separate central portion.

FIG. 1 illustrates one embodiment of the lens field of view simulator of the present invention with the four simulator plates folded over on top of one another for transport. In this embodiment each of the hinges 26a through d is progressively narrower to accommodate the extra thickness of the plate in front of it in the folded position. For example, the plate 22d is the first one to be folded over in the carrying position and has the narrowest hinge 26d. The hinge 26c is slightly wider so that when the plate 22c is folded over on top of the plate 22d there is sufficient material in the hinge to accommodate the width of the plate. Likewise, the hinge 26b is wider still to accommodate the thickness of the two plates 22d and c. Finally, the hinge 26a is the widest of the four, since the plate 22a is the topmost plate in the folded carrying position.

In the illustrated embodiment of FIGS. 1–5 the plates 22a through d are held in position in the carrying or transit mode by means of a hook latch 28 formed on an edge of the plate 22a opposite the hinged edge. When the plates are in the folded position the hook latch 28 hooks around the edge of plate 22c and the hinge 26c thereby holding the plates latched in the carrying position. When it is desired to use the simulator the hook is disengaged from the edge and the plates are folded out into the position as shown in FIGS. 3, and 4 ready for each of the plates to be selectively swung into position in register with the viewing aperture 18 so that the photographer can sight the subject through the field of view simulator. Other latching mechanisms could be employed to hold the plates in their transit position.

In FIG. 2 the simulator plate 22d is shown positioned in front of the viewing aperture 18 so that the plate 22d lies in the optical path through the lens field of view simulator. An arrow 30 illustrates the swinging path of the plate 22d between its standby position (shown in phantom in FIG. 2) and its in-use position (shown in solid lines in FIG. 2). The plate 22d in the in-use position masks a portion of the viewing aperture 18 thereby framing the subject being viewed in the same manner as it would be framed by the field of view of a corresponding lens mounted on a single lens reflex camera.

Another embodiment of the lens field of view simulator is shown in FIG. 6. The central portion 110, transition chamber 112 and eyepiece ring 116 are identical to those of the first embodiment described above. The simulator plates 122 are the same as the simulator plates 22a–d, however, rather than being hinged they are mounted for pivotal movement about a pivot pin 130 projecting from the central portion 110 in a direction parallel to the viewing direction. Each simulator plate 122 has a mounting hole 132 formed through it adjacent a corner of the plate. The plates 122 are mounted on the central portion 110 by inserting the pin 130 through the mounting hole 132 in each plate. The plates then hang in stacked orientation like the blades of a folding fan and can be selectively pivoted about pin 130 into register with the viewing aperture 118 to place the simulation aperture 124 into the optical path through the simulator. This pivotal style of mounting the plates permits a greater number of plates to be mounted simultaneously than the hinged method described above thereby increasing the number of lenses whose field of view can be simulated.

Preferably some means is provided to retain the plates 122 on the pin 130. As an example, the free end of the pin 130 could be larger than the remainder of the pin so that the plates would have to be forced over the end thereby preventing them from slipping off. Alternatively, a cap of some type can be placed on the end of the pin 130 that is larger than the mounting holes 132.

The variation in size of the apertures 24a through d and the successively widening hinges 26a through d are clearly visible in FIG. 4. The relative sizes of the apertures 24a through d and the relative widths of the hinges 26a through d are meant to be exemplary only. It should be clear that different sizes of simulation apertures can be used if the fields of view of different lenses are to be simulated and that other different hinging or pivoting mechanisms can be incorporated while remaining within the scope of the present invention. Also, as discussed earlier, while the entire lens field of view simulator illustrated is preferably molded in one piece of a plastic material it would be possible to manufacture the simulator in separate pieces and then join the pieces together after manufacture and also to use conventional hinges to hinge the plates to the central portion of the simulator. Also, if the plates and central portion are manufactured as separate pieces and conventionally hinged materials other than plastic can be used, for example, sheet metal, or even heavy grade paper. Many changes therefore can be made to the embodiments of the present invention illustrated and described herein while still remaining within the spirit and scope of the present invention as defined by the claims which follow.

The embodiments of the invention in which an exclusive property or privilege is claimed are as follows:

1. A lens field of view simulator comprising:
   a central portion having a first and second face and having a viewing aperture formed therein from said first face to said second face, said central portion including four first walls arranged in rectangular orientation, said first face being defined by contiguous first edges of said first walls;
   a plurality of plates, each plate having a lens field of view simulation aperture formed therethrough, the respective lens simulation aperture on each plate being of a different size and simulating the field of view provided by a lens of predetermined focal length;
   means for mounting said plates on said first face of said central portion for selective placement of said plates into register with said viewing aperture, each of said plates being associated with one of said first walls, said mounting means including a plurality of hinges attaching each of said plates to its associated first wall, said central portion, plates and hinges being integrally formed as a single unit.

2. The simulator of claim 1 wherein said simulator is constructed of polyethylene.

3. The simulator of claim 1 wherein said viewing aperture itself is of a size that simulates the field of view of a lens of predetermined focal length.

4. The simulator of claim 1 further including:

a transition chamber having four second walls, a first edge of each of said second walls being affixed to one of said first walls surrounding said viewing aperture, said second walls being substantially trapezoidal, said first edge being the longer parallel side of said trapezoid, said second walls being joined to one another along their nonparallel edges and arranged to form substantially a truncated pyramid;

an annular eyepiece ring affixed to said transition chamber at the area of said truncated tetrahedron opposite the point of attachment of said transition chamber to said central portion, said annular eyepiece being aligned with said viewing aperture to provide an optical path through said simulator.

5. The simulator of claim 1 further including latching means for releasably holding said plates in register with said first face of said central portion.

6. The simulator of claim 5 wherein said latching means includes a hook member affixed to one edge of one of said plates, said hook member cooperating with the edges of the remaining ones of said plates to hold the plates in position in register with said first face of said viewing aperture.

7. A lens field of view simulator comprising a central portion having a first face and a second face and having a viewing aperture formed therein from said first face to said second face through which a photographer may view a subject to be photographed;

a plurality of plates, each plate having a lens field of view simulation aperture formed therethrough, the respective lens simulation aperture of each plate being of a different size and simulating the field of view provided by a lens of predetermined focal length;

means for mounting said plates on said first face of said central portion for selective placement of said plates into register with said viewing aperture, said mounting means including a pivot pin projecting substantially orthogonally from the first face of said central portion, each of said plates having a mounting hole formed therethrough, said pivot pin engaging said mounting holes in said plates to mount said plates on said central portion in stacked relationship for pivotal movement about said pivot pin to selectively move said plates into and out of register with said viewing aperture.

* * * * *